United States Patent
Fontanot

(10) Patent No.: US 7,991,735 B2
(45) Date of Patent: Aug. 2, 2011

(54) METHOD FOR THE TRANSMISSION OF DATA SAMPLES

(75) Inventor: Paolo Fontanot, Monfalcone (IT)

(73) Assignee: Siemens Aktiengesellschaft, Munich (DE)

( * ) Notice: Subject to any disclaimer, the term of this patent is extended or adjusted under 35 U.S.C. 154(b) by 432 days.

(21) Appl. No.: 12/262,694

(22) Filed: Oct. 31, 2008

(65) Prior Publication Data

US 2009/0112826 A1 Apr. 30, 2009

(30) Foreign Application Priority Data

Oct. 31, 2007 (EP) ..................... 07021258

(51) Int. Cl.
*G06F 7/00* (2006.01)
*G06F 17/00* (2006.01)
(52) U.S. Cl. ........................ 707/610; 707/640
(58) Field of Classification Search .................. None
See application file for complete search history.

(56) References Cited

U.S. PATENT DOCUMENTS

| | | | |
|---|---|---|---|
| 6,570,852 B1 * | 5/2003 | Suzuki | 370/235 |
| 2004/0067757 A1 * | 4/2004 | Fukui | 455/453 |
| 2004/0264370 A1 * | 12/2004 | Moon et al. | 370/229 |
| 2006/0156164 A1 * | 7/2006 | Meyer et al. | 714/749 |
| 2009/0059916 A1 * | 3/2009 | DeCusatis et al. | 370/389 |

* cited by examiner

*Primary Examiner* — Kuen S Lu
*Assistant Examiner* — Tuan Phan
(74) *Attorney, Agent, or Firm* — Laurence A. Greenberg; Werner H. Stemer; Ralph E. Locher

(57) ABSTRACT

A method enables efficient and coherent sample data storage in a system containing data transmitting and receiving devices. The algorithm is implemented by storing reverse-delta encoded data at a receiver side in a chronologically correct order by a data list and a recovery table, independently of the transmission device. The sender device compares a previously attached timestamp corresponding to each sent data sample to a timestamp attached to an acknowledge signal which it gets back from the receiver device, in order to find out which sample had been correctly received at the receiver side. If the sender does not receive a corresponding pair of timestamp and acknowledge signal until a predefined time interval has elapsed, it automatically resends at least one not acknowledged data sample.

22 Claims, 2 Drawing Sheets

METHOD FOR THE TRANSMISSION OF DATA SAMPLES

CROSS-REFERENCE TO RELATED APPLICATION

This application claims the priority, under 35 U.S.C. §119, of European application EP 07 021 258.4, filed Oct. 31, 2007; the prior application is herewith incorporated by reference in its entirety.

BACKGROUND OF THE INVENTION

Field of the Invention

The invention relates to a method and a module for the safe transmission of data samples, whereby the term safe means the transmission occurs without the loss of data samples.

Methods for the safe transmission of data samples are commonly used in communication networks in order to ensure reliable processing of information at the point of use. In a transmission process there are three meaningful points of consideration: a data acquisition point (sender, remote device), a transmission channel and a point of use (receiver).

Mainly there is the problem of safe acquisition and storage of real-time data, collected by time samples from the remote device, that are transmitted at the point of use using for example the so-called commonly used reverse-delta encoding method that processes delta values over data samples.

Due to the nature of the reverse-delta encoding, the task of ensuring an accurate recording of remotely collected data is not straightforward: a single error in just one delta value is propagated down the whole chain of encoded samples. A recovery mechanism must be provided to prevent data losses in case of failures of the transmission channel: sampled data are locally stored at the acquisition point during such failures, to be transmitted again to the point of use as soon as the communication is resumed. Local buffer storage is used to keep the samples that need to be recovered. When the communication restarts the stored data as well as the freshly acquired samples are transmitted over the media. Recovery must be fast enough to avoid collisions between the two or in any case to minimize the latency due to the recovery of the lost samples.

Multiple failures of the transmission media occurring in the middle of an ongoing recovery process can result in multiple, overlapping recoveries thus generating collisions and delays with poor performances of the overall process. If the recovery process is not fast enough to receive both new incoming samples and recovered ones, this will eventually jeopardize the accuracy of the time series of samples that are stored at the point of use.

SUMMARY OF THE INVENTION

It is accordingly an object of the invention to provide a method for the transmission of data samples that overcome the above-mentioned disadvantages of the prior art methods and devices of this general type, which achieves a method for the safe transmission of data samples between the sender and the receiver wherein multiple losses of transmission can occur, especially over at least a serial communication path.

The invention is principally based respectively focusing on a method and a module.

A method for the transmission of data samples via a communication channel from a remote system to a point of use contains the now described steps. The remote system sends a data sample to the point of use together with a timestamp. The point of use sends back to the remote system for each data sample an acknowledge signal and the timestamp. The timestamp is compared by the remote system to a stored list containing all previously sent timestamps and their corresponding data samples. An error of transmission of the data sample is detected when after a predefined time interval no acknowledge for the data sample has been received at the remote system. The remote system thereby triggering in addition to the transmission of subsequent data samples at least one automatic retransmission of the data sample until the corresponding acknowledge for the data sample has been received at the remote system from the point of use. At the point of use, the data sample and the timestamp are fed into a sorting means and processed in order to find the chronologically correct position of insertion of the data sample in a data list. A plurality of received data samples and corresponding timestamps are stored in a recovery table at the point of use.

Due to the previously mentioned features, the method for efficiently accounting for transmission failures advantageously avoids any explicit mechanisms of transmission loss detection on receiver side. In other words, the receiver does not explicitly need to check for failures of the communication channel.

The transmission process is based on sending a data sample over the communication channel together with a timestamp which advantageously is used for two purposes. The first purpose is to have a method to keep track at the sender side of all successfully transmitted data samples and the second purpose is to have a way to sort the data samples to be stored in a correct order at the receiver.

The receiver does not need to trigger any recovery process but it transmits back to the sender an acknowledge signal together with the previously received corresponding timestamp for each data sample.

The sender can employ a buffer in conjunction with a simple state machine which automatically resends an acquired data sample as long as it doesn't receive an acknowledge signal from the receiver in a given period of time. The acknowledge signal is matched by the sender to the corresponding acquired data sample by comparing a timestamp which it had applied to the acquired data sample prior to sending, with the acknowledged timestamp in response from the receiver. If it finds an entry in its list for the timestamp, the sender then discards the sample from its buffer.

From the prospective of the receiver it is advantageous that very simple state machines can be used for synchronizing the sender and receiver at the point of use. Henceforth, the traffic flow does not need to be interrupted in case of failures as the received data samples do not need to be in a successive order. This is due to the fact that a sorting means structuring the received data samples depending on their timestamps is employed in a post-processing stage, which is independent of the order of received data samples as well as of the send/receive process itself, thus insuring a faster availability of the received data samples as input in a data processing system.

From the prospective of the sender it is advantageous that data samples do not need to be sent in a specific order but fresh, meaning current samples, as well as late samples, meaning data values acquired at an earlier point in time, can be sent in a random order in free sending slots, thus making use of the whole available bandwidth of the transmission channel. Further, the size of the needed buffer depends uniquely on the user-defined retransmission timeout of samples. Furthermore, the acquisition and sending processes of data can be decoupled to a large extent.

These advantages make the entire system highly multithreaded, it being understood that acquisition and sending, respectively reception and post-processing are highly independent from each other, allowing quasi real-time and continuous data transmission.

The point of use stores the received data samples in a data list in an advantageous way described later.

The point of use also stores a number of received data samples in a recovery table, having the advantage that it provides the history of the preceding received data for later use in case of erratic behavior of the system.

The present invention also avoids the disadvantages of the prior art solutions by allowing a virtually unlimited number of failures to be processed, in that it avoids the case of having to manage multiple recovery process states simultaneously. This leads to effective data processing in case of numerous failures or erratic behavior of the transmission channel. A further advantage related to the above scenario lies in the avoidance of a high latency in data throughput and overload of traffic controlling processors and of the underlying communication channel and insures responsiveness of the communication system at all times.

A yet further advantage is that the data list is reverse-delta-encoded, whereas delta-encoded data storage is more suitable for data compression and long term archiving.

The recovery table is recorded in a format containing the absolute values because these values are only needed temporarily, thus there is a very small computing effort required to keep the up to date.

Other features which are considered as characteristic for the invention are set forth in the appended claims.

Although the invention is illustrated and described herein as embodied in a method for the transmission of data samples, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
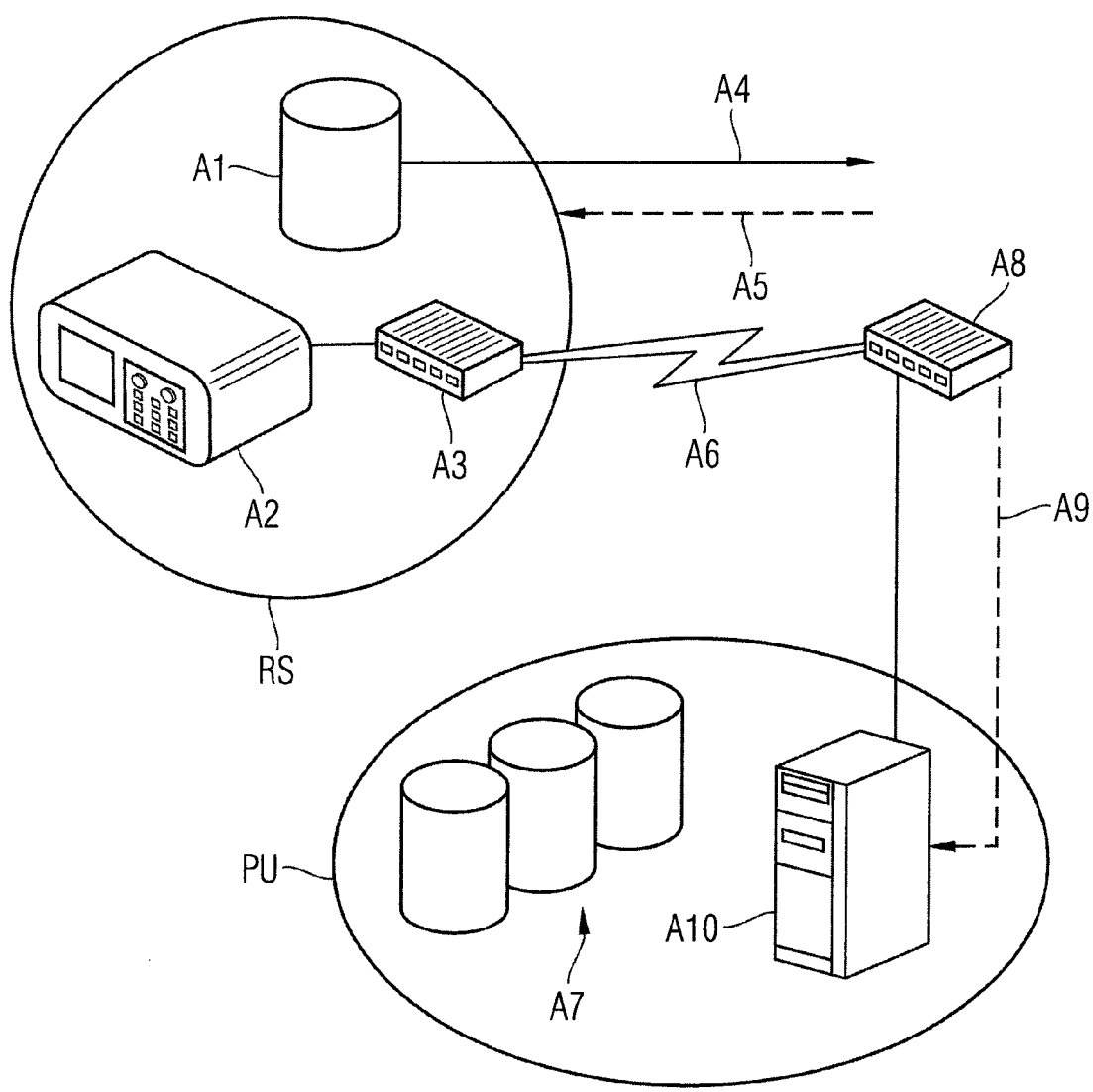
FIG. 1 is an illustration showing an example of a data acquisition system.

Referring now to the figures of the drawing in detail and first, particularly, to FIG. 1 thereof, there is shown elements of a data acquisition system, e.g. a remote data source A2 connected to a transmission or sender element A3 having a local data buffer A1, a receiver element A8 connected to an archiving server A10 containing a historical data memory A7 and a communication channel A6 connecting the transmission element A3 to the receiver element A8. The sender element A3 transmits a data sample A4 over the communication channel A6 and receives an acknowledge signal A5 in case the sample has been successfully received. The receiver element A8 passes a given, newly received data sample A9 to the archiving server A10. The prior art solutions of notify the archiving server about a connection loss, thus requiring that the receiver element A8 is able to detect the connection loss. The present solution advantageously needs no detection of connection loss but merely passes every data sample it receives to the archiving server. The point of use PU contains the archiving server A10 and the historical data memory or store A7. A remote system RS contains the remote data source A2, the sender element A3 and the local data buffer A1.

Figure 2:
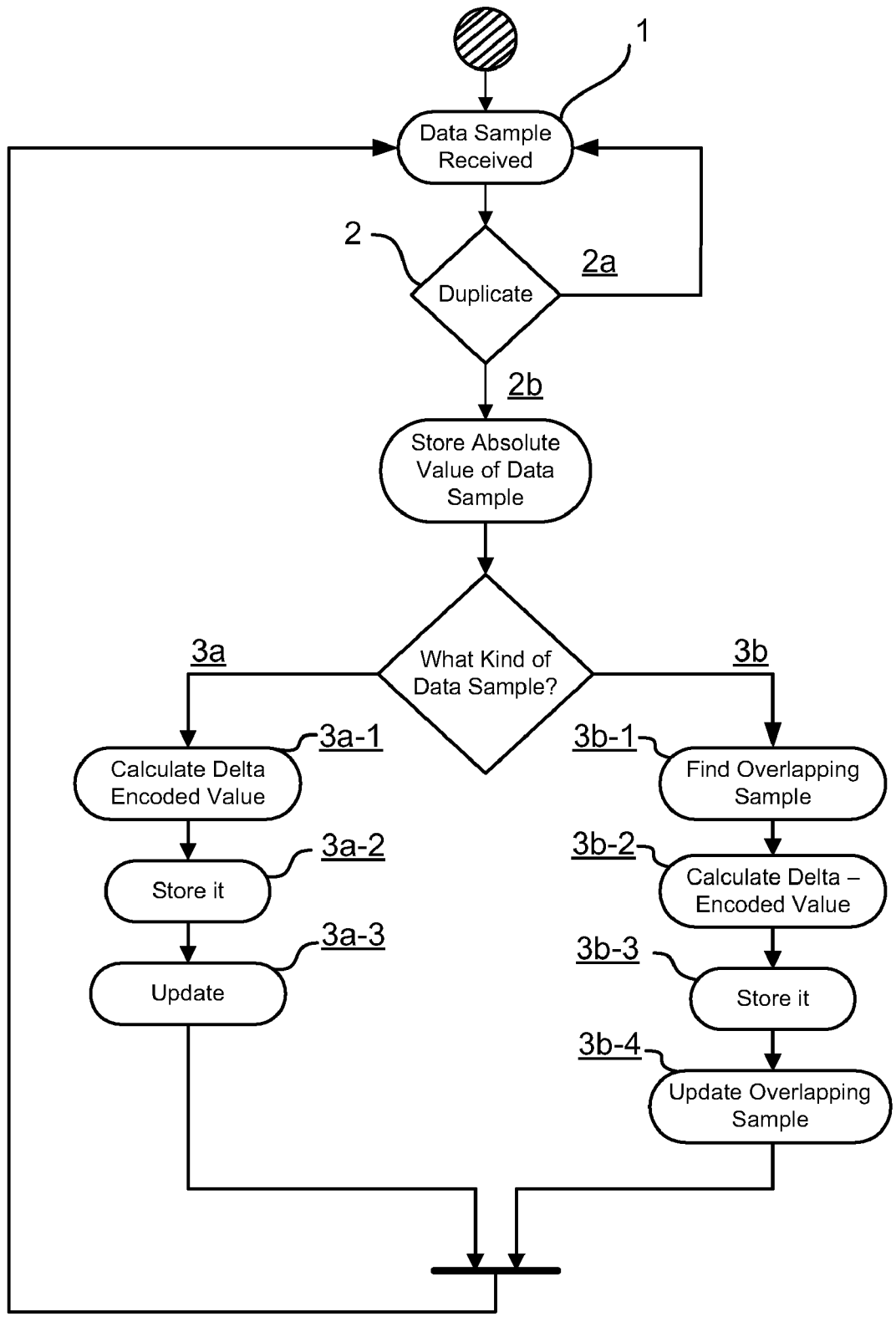
FIG. 2 is a flow chart of the underlying algorithm, illustrating possible comparison cases.

FIG. 2 shows a flow chart of the underlying algorithm, illustrating possible comparison cases. The algorithm starts with getting a received data sample $v_i$ (see step 1), then checking if the sample is duplicate (see step 2). In case the received data sample $v_i$ has been found to be a duplicate (see step 2a) the next data sample is fetched. In case the received data sample $v_i$ is not duplicate (see step 2b), the next step is executed, consisting of storing an absolute value of the received data sample $v_i$ for further processing (see step 3). The next step is to check, based on a timestamp $t_i$ of the received data sample $v_i$, what kind of data sample the system is dealing with.

In case the received sample $v_i$ is a fresh sample (see step 3a), the system calculates the delta-encoded value of it (see step 3a-1), stores it in a recovery table RT (see step 3a-2) and updates the recovery table RT (see step 3a-3).

In case the received sample $v_i$ is a late sample (see step 3b), the system finds the overlapping sample (see step 3b-1), then calculates the delta-encoded value (3b-2), stores it in the recovery table RT (3b-3) and finally updates the overlapping sample (3b-4). After either of the cases has been processed, the algorithm restarts by fetching a new sample and processing it in the same way as described above.

According to one implementation of the method, a sorting means uses a reverse delta encoding method for storing received data samples in a data list DL, whereby the data sample $v_k$ and the timestamp $t_k$ are stored in the form of a new data sequence $D_k$ containing a foregoing timestamp $start_k$, the timestamp $t_k$ and a delta encoded value $delta_k$ representing the result of subtraction of a foregoing data sample $v_{k-i}$ from the data sample $v_k$. The advantage is that this triplet ($start_k$, $t_k$, $delta_k$) of data provides all information needed to insert/append a new computed triplet at a later point in time. The timestamps $start_k$ and $t_k$ in the triplet are used to determine the position of a triplet in the data list, whereby the correct position is determined by the timestamp $t_k$ and the timestamp $start_k$ denotes the position of the foregoing entry. The storing of the data samples in a delta encoded manner advantageously minimizes conversion errors between the analogically transmitted data samples and the digitally stored values of the data samples.

According to one implementation of the method, the data list DL containing already stored data sequences $D_i$ is searched by the sorting means in order to determine an insertion position j for the new data sequence $D_k$, whereby the search is based on the comparison of the timestamp $t_k$ with a start timestamp $start_j$ and an end timestamp $end_j$, both the start timestamp $start_j$ and the end timestamp $end_j$ belonging to a single already stored data sequence $D_j$. The advantage is that a simple look up algorithm can be used for a fast search in the data list DL, in that the search result matches to not more than three possible cases, which are explained below.

According to one implementation of the method, the search finds the timestamp $t_k$ to be greater than the start timestamp $start_j$ and equal to the end timestamp $end_j$, thus meaning that the data sample $v_k$ corresponding to the timestamp $t_k$ is identical to a previously processed data sample. This method advantageously accounts for a possible transmission error case reflecting the possibility that the sender retransmits a missed data sample more than once because, even though the receiver has received the missed data sample it has not been able to acknowledge it before the predefined retransmission timeout at sender side has elapsed. Thus, the sorting means at the receiver side is not negatively affected by an accidental receipt of duplicate data samples.

According to a preferred implementation of the method, an update of the data list DL is bypassed. As the last received data sample $v_k$ in the above case is discarded, no change is required for the data list, thus optimizing the memory usage.

According to a preferred implementation of the method, the search finds the timestamp $t_k$ to be greater than a highest already stored timestamp $end_{i\_max}$, thus meaning that the data sample $v_k$ corresponding to the timestamp $t_k$ is the most current data sample. A second case in the search of the data list is that the data sample $v_k$ is found to be the most current data sample because its timestamp is higher than any of the recorded timestamps.

According to a preferred implementation of the method, a highest stored data sample $v_{i\_max}$ is retrieved from the recovery table RT. In order to compute the delta encoded value to be stored in the data list, the latest record in the recovery table is retrieved.

According to a preferred implementation of the method, the new data sequence $D_k$ is built and appended to the data list DL, containing the highest already stored timestamp $end_{i\_max}$ the timestamp $t_k$ and the delta encoded value $delta_k$ computed as the result of subtraction of the highest stored data sample $v_{i\_max}$ from the data sample $v_k$. The new data sequence $D_k$ can be built and advantageously appended to the data list.

According to a preferred implementation of the method, the search finds the timestamp $t_k$ to lie between the start timestamp $start_j$ and the end timestamp $end_j$, thus meaning that the data sample $v_k$ corresponding to the timestamp $t_k$ is a late sample. A third case in the search of the data list is that the data sample $v_k$ is found to be an at least once retransmitted sample because the sorting algorithm has found the position to be somewhere between already stored data sequences.

According to a preferred implementation of the method, a first data sample $v_{b1}$ and a second data sample $v_{b2}$ are retrieved from the recovery table RT, such that the timestamp $t_k$ of the data sample $v_k$ is positioned between a timestamp $t_{b1}$ of the first data sample $v_{b1}$ and a timestamp $t_{b2}$ of the second data sample $v_{b2}$. Thus, the above mentioned case requires the retrieval of the 2 backup data samples stored in the recovery table ($v_{b1}$ and $v_{b2}$) which are positioned before, respectively after the data sample $v_k$ in order to compute the delta encoded value of the data sample $v_k$ and to recompute the delta encoded value of the next higher data sequence.

According to a preferred implementation of the method, the new data sequence $D_k$ containing the start timestamp $start_j$, the timestamp $t_k$ and the delta encoded value $delta_k$ is built and inserted in the data list DL foregoing to the already stored data sequence $D_j$, latest being replaced by a recomputed data sequence $D_{j1}$ containing the timestamp $t_k$, the end timestamp $end_j$ and the second delta encoded value $delta_{k2}$. Based on the two data sample values ($v_{b1}$ and $v_{b2}$) retrieved in the preceding step, the data sequence of the current sample $v_k$ is computed and inserted at the right position in the list and the next higher data sequence is recomputed and replaced.

According to a preferred implementation of the method, an update of the data list DL can be performed in a single step for a series of consecutive late samples. If a number of consecutive late samples have been received, the above step advantageously requires the recomputation of a single stored data sequence, this data sequence being one higher than the highest late received sample.

According to a preferred implementation of the method, the sorting means performs a direct lookup of the recovery table RT in order to find the presence of the data sample $v_k$ and the timestamp $t_k$.

According to a preferred implementation of the method, the sorting means has found the data sample $v_k$ and the timestamp $t_k$ in the recovery table RT, thus meaning that the data sample $v_k$ is a previously processed data sample. An alternative and fast way to account for the case data sample has been transmitted more than once is to directly look up the recovery table and, if the sample is found, discard the duplicate received currently without needing to perform computations in the data list.

According to a preferred implementation of the method, an update of the recovery table RT is bypassed. This method advantageously fastens the algorithm by bypassing a memory update.

According to a preferred implementation of the method, the sorting means stores the recovery table RT in a volatile memory. This method advantageously makes use of fast memories in order to speed up the algorithm.

According to a preferred implementation of the method, the size of the volatile memory is user selected. This method advantageously makes the system highly adaptable to numerous applications with different hardware, security and software requirements. Another advantage is that the size allocated for the RT can be made conveniently small according to the maximum size allowed for a no-data loss interval.

According to a preferred implementation of the method, the sorting means is initialized with an initial data sample $v_0$ and an initial timestamp $t_0$. The initial start values of timestamp and data sample advantageously need to be initialized once, at the beginning of the transmission session.

According to a preferred implementation of the method, a predefined time interval PT is selected at the user side. This method advantageously allows the system to be adapted to numerous applications requiring variable response times.

According to a preferred implementation of the method, each new received sample $v_n$ is recursively processed in the same way like the data sample $v_k$. The advantage is that the algorithm is recursive and does not need to be changed or adapted to different sample types.

According to a preferred implementation of the method, the data list is stored in the historical data store A7. This advantageously suppresses any memory size constraint for the acquired data, thus being able to provide the necessary data volume to a further data processing system.

In a preferred embodiment of the invention, it is advantageous to realize a module with measures for implementing the method described above, wherein the module is for example an interfacing element connectable between the receiver element A8 and the archiving server A10 of the point of use PU. Therefore the module can be easily placed or inserted at the receiving side of the communication system, because the invention applies advantageously independently to all parts or transmission protocols of the sending side (remote system). In a first hardware version, the module can comprise an electronical element that performs an algorithm on data samples over the communication path according to the method described above. It is also possible to realize the module for implementing by software measures the method according to the invention by updating the communication protocols of one of the element at the receiving side (e.g. point of use).

The invention claimed is:

1. A method for transmitting data samples via a communication channel from a remote system to a processing unit, which comprises the steps of:
sending, via the remote system, a data sample $v_k$ to the processing unit together with a timestamp $t_k$;
sending back, from the processing unit, to the remote system for the data sample $v_k$ an acknowledge signal and the timestamp $t_k$;
comparing the timestamp $t_k$ in the remote system to a stored list containing all previously sent timestamps and their corresponding data samples;
detecting an error of transmission of the data sample $v_k$ if after a predefined time interval no acknowledge for the data sample $v_k$ has been received at the remote system, the remote system thereby triggering in addition to the transmission of subsequent data samples at least one automatic retransmission of the data sample $v_k$ until a corresponding acknowledge for the data sample $v_k$ has been received at the remote system from the processing unit;
feeding, at the processing unit, the data sample $v_k$ and the timestamp $t_k$ into sorting means and in the sorting means processing the data sample $v_k$ and the timestamp $t_k$ to find a chronologically correct position of insertion of the data sample $v_k$ in a data list;
providing the sorting means with a delta encoding method for storing the received data samples in the data list; and
storing a plurality of received data samples and corresponding timestamps in a recovery table for the processing unit by storing the data sample $v_k$ and the timestamp $t_k$ in a form of a new data sequence $D_k$ containing a foregoing timestamp $start_k$, the timestamp $t_k$ and a delta encoded value $delta_k$ representing a result of a subtraction of a foregoing data sample $v_{k-i}$ from the data sample $v_k$, whereby i is less than k.

2. The method according to claim 1, which further comprises searching the data list containing already stored data sequences $D_i$ via the sorting means to determine an insertion position j for the new data sequence $D_k$, whereby the search is based on a comparison of the timestamp $t_k$ with a start timestamp $start_j$ and an end timestamp $end_j$, both the start timestamp $start_j$ and the end timestamp $end_j$ belonging to a single already stored data sequence $D_j$.

3. The method according to claim 2, wherein if the searching step finds the timestamp $t_k$ to be greater than the start timestamp $start_j$ and equal to the end timestamp $end_j$, it is concluded that the data sample $v_k$ corresponding to the timestamp $t_k$ is identical to a previously processed data sample.

4. The method according to claim 3, which further comprises bypassing an updating of the data list.

5. The method according to claim 2, wherein if the searching step finds the timestamp $t_k$ to be greater than a highest already stored timestamp $end_{i\_max}$, it is concluded that the data sample $v_k$ corresponding to the timestamp $t_k$ is the most current data sample.

6. The method according to claim 5, which further comprises retrieving a highest stored data sample $v_{i\_max}$ from the recovery table.

7. The method according to claim 5, which further comprises building and appending the new data sequence $D_k$ to the data list, the new data sequence $D_k$ contains the highest already stored timestamp $end_{i\_max}$, the timestamp $t_k$ and the delta encoded value $delta_k$ computed as a result of a subtraction of the highest stored data sample $v_{i\_max}$ from the data sample $v_k$.

8. The method according to claim 2, wherein if the searching step finds the timestamp $t_k$ to lie between the start timestamp $start_j$ and the end timestamp $end_j$, it is concluded that the data sample $v_k$ corresponding to the timestamp $t_k$ is a late sample.

9. The method according to claim 8, which further comprises retrieving a first data sample $v_{b1}$ and a second data sample $v_{b2}$ from the recovery table, such that the timestamp $t_k$ of the data sample $v_k$ is positioned between a first timestamp $t_{b1}$ of the first data sample $v_{b1}$ and a second timestamp $t_{b2}$ of the second data sample $v_{b2}$.

10. The method according to claim 9, which further comprises:
computing the delta encoded value $delta_k$ as a result of a subtraction of the first data sample $v_{b1}$ from the data sample $v_k$; and
computing a second delta encoded value $delta_{k2}$ as a result of a subtraction of the data sample $v_k$ from the second data sample $v_{b2}$.

11. The method according to claim 10, which further comprises building and inserting the new data sequence $D_k$ containing the start timestamp $start_j$, the timestamp $t_k$ and the delta encoded value $delta_k$, in the data list, foregoing to an already stored data sequence $D_j$, with the latest being replaced by a recomputed data sequence $D_{j1}$ containing the timestamp $t_k$, the end timestamp $end_j$ and the second delta encoded value $delta_{k2}$.

12. The method according to claim 8, which further comprises performing an update of the data list in a single step for a series of consecutive late samples.

13. The method according to claim 1, which further comprises performing, via the sorting means, a direct lookup of the recovery table to find a presence of the data sample $v_k$ and the timestamp $t_k$.

14. The method according to claim 13, wherein if the sorting means finds the data sample $v_k$ and the timestamp $t_k$ in the recovery table, it is concluded that the data sample $v_k$ is a previously processed data sample.

15. The method according to claim 14, which further comprises bypassing an updating of the recovery table.

16. The method according to claim 1, which further comprises storing, via the sorting means, the recovery table in a volatile memory.

17. The method according to claim 16, which further comprises allowing a user to select a size of the volatile memory.

18. The method according to claim 1, which further comprises initializing the sorting means with an initial data sample $v_0$ and an initial timestamp $t_0$.

19. The method according to claim 1, which further comprises selecting the predefined time interval at a user side.

20. The method according to claim 1, which further comprises recursively processing each new received data sample $v_n$ in a same way like the data sample $v_k$.

21. The method according to claim 1, which further comprises storing the data list in a historical data store.

22. A module to be connected between a receiver element and an archiving server of a communication path, the module comprising:
a computer processor; and
means programmed to:
send, via a remote system, a data sample $v_k$ to the archiving server together with a timestamp $t_k$;
send back, from the archiving server, to the remote system for the data sample $v_k$ an acknowledge signal and the timestamp $t_k$;

compare the timestamp $t_k$ in the remote system to a stored list containing all previously sent timestamps and their corresponding data samples;

detect an error of transmission of the data sample $v_k$ if after a predefined time interval no acknowledge for the data sample $v_k$ has been received at the remote system, the remote system thereby triggering in addition to the transmission of subsequent data samples at least one automatic retransmission of the data sample $v_k$ until a corresponding acknowledge for the data sample $v_k$ has been received at the remote system from the archiving server;

feed, at the archiving server, the data sample $v_k$ and the timestamp $t_k$ into sorting means and the sorting means processing the data sample $v_k$ and the timestamp $t_k$ to find a chronologically correct position of insertion of the data sample $v_k$ in a data list;

provide the sorting means with a delta encoding method for storing the received data samples in the data list; and store a plurality of received data samples and corresponding timestamps in a recovery table for the archiving server by storing the data sample $v_k$ and the timestamp $t_k$ in a form of a new data sequence $D_k$ containing a foregoing timestamp $start_k$, the timestamp $t_k$ and a delta encoded value $delta_k$ representing a result of a subtraction of a foregoing data sample $v_{k-i}$ from the data sample $v_k$, whereby i is less than k.

* * * * *